United States Patent
Kudo et al.

(10) Patent No.: US 7,571,443 B2
(45) Date of Patent: Aug. 4, 2009

(54) COLLABORATION APPARATUS BETWEEN INFORMATION PROCESSING SYSTEMS, INTEGRATED INFORMATION PROCESSING SYSTEM, AND RECORDING MEDIUM STORING A COLLABORATION PROGRAM BETWEEN INFORMATION PROCESSING SYSTEMS

(75) Inventors: Akira Kudo, Oita (JP); Haruko Sota, Tokorozawa (JP)

(73) Assignee: Fujitsu Limited, Kawasaki (JP)

( * ) Notice: Subject to any disclaimer, the term of this patent is extended or adjusted under 35 U.S.C. 154(b) by 217 days.

(21) Appl. No.: 09/874,283

(22) Filed: Jun. 6, 2001

(65) Prior Publication Data
US 2001/0042092 A1  Nov. 15, 2001

Related U.S. Application Data

(63) Continuation of application No. PCT/JP99/03867, filed on Jul. 16, 1999.

(30) Foreign Application Priority Data

Dec. 7, 1998 (JP) .................................. 10-347132

(51) Int. Cl.
G06F 9/44 (2006.01)
G06F 15/16 (2006.01)

(52) U.S. Cl. .................... 719/316; 709/200; 709/248

(58) Field of Classification Search ................ 709/310, 709/201, 316, 101, 102, 200, 246, 248; 707/4, 707/9, 10, 201, 200; 713/165; 719/316, 719/310, 329
See application file for complete search history.

(56) References Cited

U.S. PATENT DOCUMENTS 4,714,995 A * 12/1987 Materna et al. ............ 707/201
(Continued)

FOREIGN PATENT DOCUMENTS

EP  0 592 146 A2  4/1994
(Continued)

OTHER PUBLICATIONS

Kolland et al. "Information Sharing in Collaborative Environments" 1994 IEEE, pp. 140-154.*
(Continued)

Primary Examiner—Van H Nguyen
(74) Attorney, Agent, or Firm—Staas & Halsey LLP

(57) ABSTRACT

The present invention relates to a collaboration apparatus between information processing systems for allowing a plurality of information processing systems to collaborate with each other without awareness of the difference in architecture, and an integrated information processing system in which a plurality of information processing systems are combined by using such a collaboration apparatus between information processing systems. In the case of allowing an SFA system (30) to collaborate with an ERP system (10) in the integrated information processing system including a plurality of information systems, an intersystem collaboration object (40) of the collaboration apparatus between information processing systems generates an active role (51) corresponding to a system of a collaboration origin and a passive role (52) corresponding to a system of a collaboration target, generates a relating object (53) between these roles in accordance with collaboration information defining a communication method between information systems, and transmits a transaction between the active role (51) and the passive role (52).

6 Claims, 19 Drawing Sheets

U.S. PATENT DOCUMENTS

| | | | |
|---|---|---|---|
| 5,263,167 A * | 11/1993 | Conner et al. | 707/4 |
| 5,596,744 A * | 1/1997 | Dao et al. | 707/10 |
| 5,666,553 A | 9/1997 | Crozier | |
| 5,787,175 A * | 7/1998 | Carter | 713/165 |
| 6,202,066 B1 * | 3/2001 | Barkley et al. | 707/9 |
| 6,233,600 B1 * | 5/2001 | Salas et al. | 709/201 |
| 6,256,676 B1 * | 7/2001 | Taylor et al. | 709/246 |
| 6,412,017 B1 * | 6/2002 | Straube et al. | 719/313 |
| 6,425,016 B1 * | 7/2002 | Banavar et al. | 709/310 |
| 6,738,975 B1 * | 5/2004 | Yee et al. | 719/310 |
| 7,200,847 B2 * | 4/2007 | Straube et al. | 719/313 |

FOREIGN PATENT DOCUMENTS

| | | | |
|---|---|---|---|
| JP | 02190961 A | 7/1990 | |
| JP | 07248950 A | 9/1995 | |
| JP | 09247201 A | 9/1997 | |
| WO | 00/57311 | 9/2000 | |
| WO | 00/79429 A1 | 12/2000 | |

OTHER PUBLICATIONS

"Nikkei Open Systems" (Jan. 1998, No. 58).
"Nikkei Open Systems" (Feb. 1998, No. 59).
"Oracle8 Architecture" (by Steve Bobrowski, Mar. 1998).
Nikkei Open Systems, Feb. 1998, No. 59, pp. 236-239.
Oracle8 Architecture, Mar. 1998, pp. 269-270.

* cited by examiner

| Path | Communication method |
|---|---|
| SFA → ERP | Real |
| ERP → SCM | Delayed batch |

FIG. 3

| Attribute tag $T_1$ | Update flag $F_1$ | Data part $D_1$ | Attribute tag $T_2$ | Update flag $F_2$ | Data part $D_2$ |

FIG. 6

| Path | Communication method |
|---|---|
| SFA → ERP | Real |
| ERP → SCM | Delayed batch |
| Sales subsystem → Accounting subsystem | Real |
| Accounting subsystem → Stock management subsystem | Real |
| Stock management subsystem → Production collaboration subsystem | Batch |

FIG. 7

| Path | Communication method |
|---|---|
| Order receiving processing program → Order placement processing program | Real |

FIG. 12

| Path | Communication method |
|---|---|
| ERP ⟶ SCM | Real |
| SCM ⟶ SFA | Delayed batch |

FIG. 16

COLLABORATION APPARATUS BETWEEN INFORMATION PROCESSING SYSTEMS, INTEGRATED INFORMATION PROCESSING SYSTEM, AND RECORDING MEDIUM STORING A COLLABORATION PROGRAM BETWEEN INFORMATION PROCESSING SYSTEMS

This application is a continuing application, filed under 35 U.S.C. §111(a), of International Application PCT/JP99/03867, filed Jul. 16, 1999, it being further noted that priority is based upon Japanese Patent Application 10-347132, filed Dec. 7, 1998.

TECHNICAL FIELD

The present invention relates to an integrated information processing system in which a plurality of systems including information processing systems configured based on different architectures are connected to each other. In particular, the present invention relates to a collaboration apparatus between information processing systems for allowing the plurality of information processing systems to collaborate with each other, and an integrated information processing system in which a plurality of information processing systems are combined by using such a collaboration apparatus between information processing systems.

BACKGROUND ART

Conventionally, a transaction system using a computer has been configured and utilized in various transaction fields, such as a sales system for managing the receiving of orders, placement of orders, sales, and the like of goods, a stock management system, a personnel system for managing personnel information, or an accounting system.

Furthermore, for example, there is a need for inquiring a stock management system for the presence/absence of the stock of goods ordered through a sales system. Thus, the need arises for conducting collaboration processing by passing data or messages among a plurality of systems.

Therefore, in the past, in order to allow a plurality of systems to collaborate with each other, a replication function of an RDBMS (relational database management system), an asynchronous message communication (message queue) function of loosely combining systems, and an ftp (file transfer program) function have been used.

However, the use of the above-mentioned file transfer function generally needs a human's operation during use, which takes time and effort, and may cause misoperation.

Furthermore, in the case of using the above-mentioned replication function of the RDBMS and asynchronous message communication function, system modification is required. In this case, if all the systems that are to collaborate are configured based on the same architecture, so-called system integration can be relatively easily conducted.

However, in recent years, technological innovation has advanced in the computer field, and various computer architectures have been established; therefore, respective venders that provide computer systems often adopt different architectures. In such a case, there is a problem that securement of human resources and education for system integration become a serious burden on a user.

DISCLOSURE OF INVENTION

In order to overcome the above-mentioned conventional problems, the object of the present invention is to provide a collaboration apparatus between information processing systems for combining a plurality of information processing systems without awareness of the difference in architecture among them, and an integrated information processing system in which a plurality of information processing systems are combined by using such a collaboration apparatus between information processing systems.

In order to solve the above-mentioned problems, a first collaboration apparatus between information processing systems according to the present invention allows a plurality of information processing means including information processing means based on different architectures to collaborate with each other, and is characterized by including: collaboration information storage means for storing collaboration information among the plurality of information processing means; role object generating means for generating role objects respectively corresponding to the information processing means that are allowed to collaborate with each other; and relating object generating means for referring to the collaboration information of the collaboration information storage means and generating a relating object for collaboration between the role objects.

According to the above-mentioned configuration, in the case where collaboration processing such as passing of data is required from information processing means to another information processing means, unlike the prior art, collaboration processing is not conducted directly between the information processing means, and collaboration processing in accordance with a relating object is conducted between role objects generated with respect to each information processing means that is required to collaborate with each other through a collaboration apparatus between information processing systems.

Because of the above, in collaboration processing, each information processing means does not need to be aware of the difference in architecture with respect to information processing means that is a collaboration target. Furthermore, processing of generating an object for collaboration between information processing means is centralized at the collaboration apparatus between information processing systems. Therefore, in the case where the collaboration between the information processing means is changed, or new information processing means is added, the collaboration apparatus between information processing systems may merely be corrected. As a result, a plurality of information processing means can be combined without awareness of the difference in architecture among them, and a collaboration apparatus between information processing systems can be provided, which is capable of reducing a burden in integration of systems and configuration of an intercompany collaboration system.

In the above-mentioned first collaboration apparatus between information processing systems, it is preferable that the collaboration information contains timing information on timing of passing of information between the information processing means.

Because of the above, the timing of collaboration between information processing means can be arbitrarily specified, so that the versatility of the system is enhanced.

It is preferable that the timing information is selected from a plurality of kinds of communication methods including real communication, delayed batch communication, and batch communication.

Furthermore, in order to achieve the above-mentioned object, a second collaboration apparatus between information processing systems according to the present invention allows a plurality of information processing means including information processing means based on different architectures to collaborate with each other, and is characterized by including: information identification object generating means for generating an information identification object that determines information to be stored in a storage apparatus of each information processing means; collaboration information storage means for storing collaboration information among the plurality of information processing means; role object generating means for referring to the collaboration information of the collaboration information storage means and generating respective role objects of the information processing means that are allowed to collaborate with each other; and relating object generating means for referring to the collaboration information of the collaboration information storage means and generating a relating object for transmitting information to be stored in a storage apparatus of each information processing means between the role objects.

According to the above-mentioned configuration, in the case where a plurality of information processing means hold the identical information in each storage apparatus in duplicate, information to be updated in a storage apparatus is determined by an information identification object, and transmitted between role objects generated in accordance with the collaboration information of the collaboration information storage means by a relating object generated similarly in accordance with the collaboration information of the collaboration information storage means. More specifically, in the above-mentioned configuration, unlike the prior art, the consistency of information is not maintained by directly transmitting information required to be updated among information processing means through file transfer or the like, and information held by a plurality of information processing means in duplicate can be managed in a unified manner by defining collaboration of each information processing means in the collaboration information storage means.

Because of this, each information processing means can maintain the consistency of information among a plurality of information processing means without awareness of the difference in architecture with respect to those of the other information processing means holding the identical information. Furthermore, processing of generating an object for collaboration between information processing means is centralized at the collaboration apparatus between the information processing systems. Therefore, in the case where the collaboration between information processing means is changed, and new information processing means is added, the collaboration apparatus between information processing systems may merely be corrected. As a result, a plurality of information processing means can be combined without awareness of the difference in architecture among them, and a collaboration apparatus between information processing systems can be provided, which is capable of reducing a burden for integration of systems and configuration of an intercompany collaboration system.

In the second collaboration apparatus between information processing systems, it is preferable that the collaboration information contains timing information on timing of passing of information between the information processing means.

Because of this, the timing of collaboration between information processing means can be arbitrarily specified, so that the versatility of the system is enhanced.

Furthermore, it is preferable that the timing information is selected from a plurality of kinds of communication methods including real communication, delayed batch communication, and batch communication.

In order to achieve the above-mentioned object, a first integrated information processing system of the present invention including a plurality of information processing means is characterized in that the plurality of information processing means include information processing means based on different architectures, and the system includes collaboration information storage means for storing collaboration information among the plurality of information processing means, and a collaboration apparatus between information processing systems for referring to the collaboration information of the collaboration information storage means and allowing the information processing means to collaborate with each other.

According to the above-mentioned configuration, in the case where collaboration processing such as passing of data is required from information processing means to another information processing means, unlike the prior art, collaboration processing is not conducted directly between the information processing means, but is conducted between role objects generated with respect to each information processing means that is required to collaborate with each other in accordance with a relating object, through a collaboration apparatus between information processing systems Because of the above, in collaboration processing, each information processing means does not need to be aware of the difference in architecture with respect to information processing means that is a collaboration target. Furthermore, processing of generating an object for collaboration between information processing means is centralized at the collaboration apparatus between information processing systems. Therefore, in the case where the collaboration between the information processing means is changed, or new information processing means is added, the collaboration apparatus between information processing systems may merely be corrected. As a result, a plurality of information processing means can be combined without awareness of the difference in architecture among them, and an integrated information processing system that is easily configured can be provided.

In order to achieve the above-mentioned object, a second integrated information processing system of the present invention including a plurality of information processing means is characterized in that the plurality of information processing means includes information processing means based on different architectures, and the system includes information identification object generating means for generating an information identification object that determines information to be stored in a storage apparatus of each information processing means, collaboration information storage means for storing collaboration information among the plurality of information processing means, role object generating means for generating respective role objects of the information processing means that are allowed to collaborate with each other, and relating object generating means for referring to the collaboration information of the collaboration information storage means and generating a relating object for transmitting information to be stored in a storage apparatus of each information processing means between the role objects.

According to the above-mentioned configuration, in the case where a plurality of information processing means hold the identical information in each storage apparatus in duplicate, information to be updated in a storage apparatus is determined by an information identification object, and transmitted between role objects generated in accordance with the collaboration information of the collaboration information storage means by a relating object generated similarly in accordance with the collaboration information of the collaboration information storage means. More specifically, in the above-mentioned configuration, unlike the prior art, the consistency of information is not maintained by directly transmitting information required to be updated among information processing means through file transfer or the like, and information held by a plurality of information processing means in duplicate can be managed in a unified manner by defining collaboration of each information processing means in the collaboration information storage means.

Because of this, each information processing means can maintain the consistency of information among a plurality of information processing means without awareness of the difference in architecture with respect to those of the other information processing means holding the identical information. Furthermore, processing of generating an object for collaboration between information processing means is centralized at the collaboration apparatus between the information processing systems. Therefore, in the case where the collaboration between information processing means is changed, and new information processing means is added, the collaboration apparatus between information processing systems may merely be corrected. As a result, a plurality of information processing means can be combined without awareness of the difference in architecture among them, and an integrated information processing system that is easily configured can be provided.

Furthermore, in order to achieve the above-mentioned object, a first recording medium storing a collaboration program between information processing systems of the present invention is a computer-readable recording medium storing a collaboration program between information processing systems that allows a computer to execute processing of allowing a plurality of information processing means including information processing means based on different architectures to collaborate with each other, the program allowing a computer to execute: processing of generating role objects respectively corresponding to the information processing means that are allowed to collaborate with each other; and processing of referring to collaboration information among the plurality of information processing means and generating a relating object for collaboration between the role objects.

Furthermore, in order to achieve the above-mentioned object, a second recording medium storing a collaboration program between information processing systems of the present invention is a computer-readable recording medium storing a collaboration program between information processing systems that allows a computer to execute processing of allowing a plurality of information processing means including information processing means based on different architectures to collaborate with each other, the program allowing a computer to execute: processing of generating an information identification object that determines information to be stored in a storage apparatus of each information processing means; processing of generating respective role objects of the information processing means that are allowed to collaborate; and processing of referring to collaboration information among the plurality of information processing means and generating a relating object for transmitting information to be stored in a storage apparatus of each information processing means between the role objects.

BRIEF DESCRIPTION OF DRAWINGS

FIG. 3 is a diagram illustrating exemplary information stored in a collaboration information storage table of the collaboration apparatus between information processing systems.

FIG. 6 is a diagram illustrating an exemplary format of data passed among respective systems in the integrated information processing system.

FIG. 7 is a diagram illustrating exemplary information stored in a collaboration information storage table of a collaboration apparatus between information processing systems in an integrated information processing system of Embodiment 2 according to the present invention.

FIG. 12 is a diagram illustrating exemplary information stored in a collaboration information storage table of a collaboration apparatus between information processing systems in the integrated information processing system of Embodiment 3.

FIG. 16 is a diagram illustrating exemplary information stored in a collaboration information storage table of a collaboration apparatus between information processing systems in the integrated information processing system of Embodiment 4.

BEST MODE FOR CARRYING OUT THE INVENTION

EMBODIMENT 1

Hereinafter, the present invention will be described by way of an embodiment with reference to the drawings.

Figure 1:
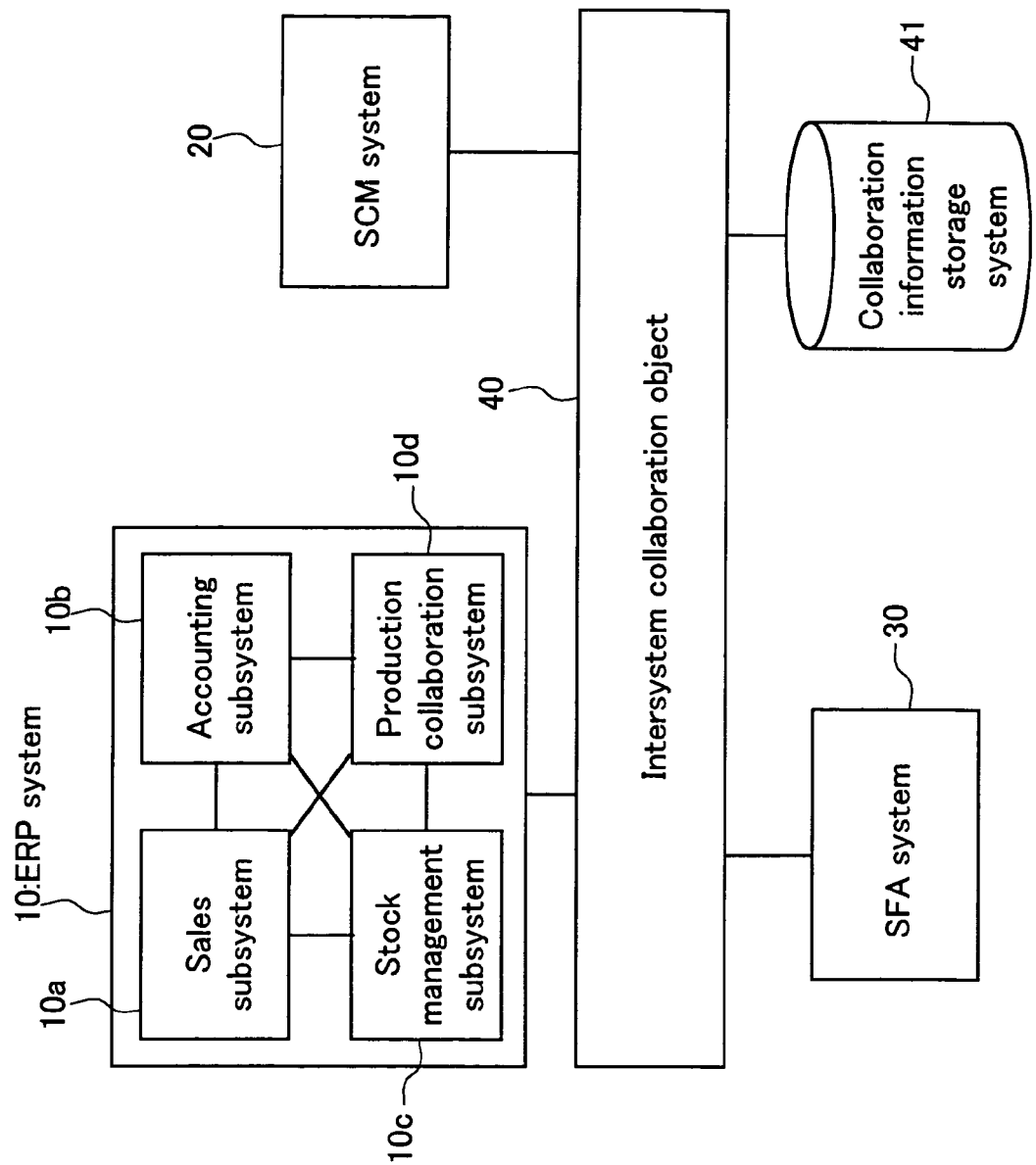
FIG. 1 is a block diagram showing a schematic configuration of an integrated information processing system of Embodiment 1 according to the present invention.

FIG. 1 is a diagram illustrating a configuration of an integrated information processing system in which a plurality of systems (information processing means) are integrated by a collaboration apparatus between information processing systems of the present invention.

As shown in FIG. 1, the integrated information processing system has a configuration in which three information processing systems, each being operated independently: an integrated transaction package (hereinafter, referred to as an "ERP") system 10, a supply chain management (hereinafter, referred to as an "SCM") system 20, and a sales force automation (hereinafter, referred to as an "SFA") system 30 are combined through an intersystem collaboration object 40.

The integrated information processing system further includes a collaboration information storage table 41 storing collaboration information among the ERP system 10, the SCM system 20, and the SFA system 30. The intersystem collaboration object 40 allows the systems to collaborate with each other by referring to the collaboration information in the collaboration information storage table 41. More specifically, in the present embodiment, the intersystem collaboration object 40 and the collaboration information storage table 41 constitute the collaboration apparatus between information processing systems.

The ERP system 10 is composed of a plurality of subsystems such as a sales subsystem 10a, an accounting subsystem 10b, a stock management subsystem 10c, and a production collaboration subsystem 10d. More specifically, upon receiving an order for goods, the sales subsystem 10a conducts processing of issuing an order intake slip, and the accounting subsystem 10b issues a debit note. Furthermore, the stock management subsystem 10c confirms the presence/absence of the stock of ordered goods. In the case where the stock of the goods has run out, the production collaboration subsystem 10d creates data for requesting the production of the goods to request collaboration with the SCM system 20.

The SCM system 20 globally manages things and information throughout the entire distribution process including the acquirement of raw materials, production, and delivery to customers, so as to optimize the entire process. The SCM system 20 may also be composed of a plurality of subsystems in the same way as in the ERP system 10.

The SFA system 30 supports a person in charge of business, and has functions of a help desk, sales prediction, contact management, and the like. The SCM system 20 may also be composed of a plurality of subsystems in the same way as in the ERP system 10.

Figure 2:
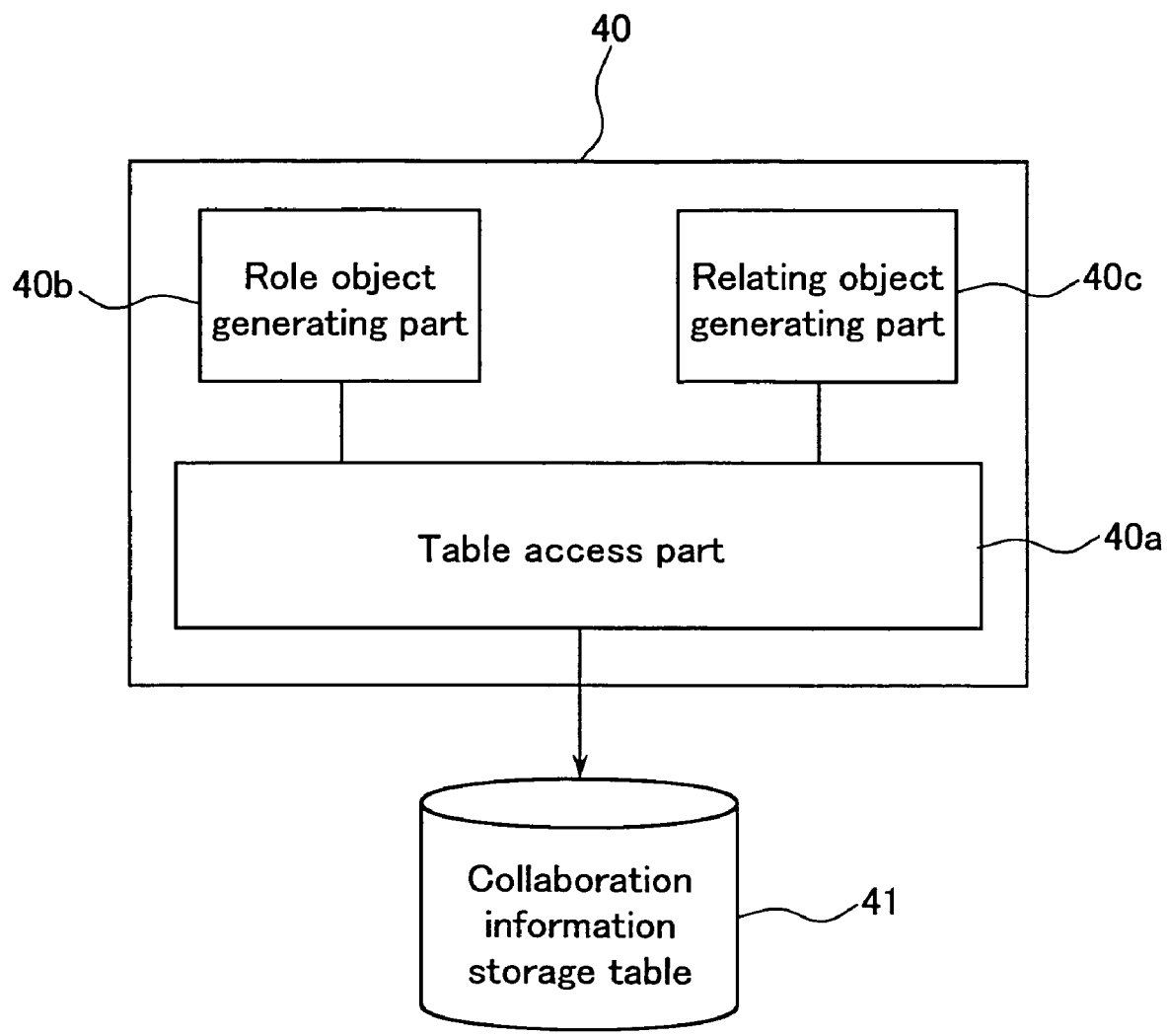
FIG. 2 is a block diagram showing a schematic configuration of a collaboration apparatus between information processing systems provided in the integrated information processing system.

As shown in FIG. 2, the intersystem collaboration object 40 includes a table access part 40a for accessing the collaboration information storage table 41 to obtain collaboration information therefrom, a role object generating part 40b (role object generating means) for generating a role object described later, and a relating object generating part 40c (relating object generating means) for generating a relating object for collaboration between role objects.

Herein, the collaboration information referred to by the intersystem collaboration object 40 in the integrated information processing system will be described. As shown in FIG. 3, the collaboration information storage table 41 of the present embodiment stores, as collaboration information, paths for transactions transmitted among the ERP system 10, the SCM system 20, and the SFA system 30, and a communication method thereof.

In an example shown in FIG. 3, the communication method of a transaction from the SFA system 30 to the ERP system 10 is a real method in which communication is conducted immediately. The communication method of a transaction from the ERP system 10 to the SCM system 20 is a delayed batch method in which a transmission origin accumulates data without depending upon the state of a transmission target, and the transmission target conducts processing asynchronously to the transmission origin, if required.

The example in FIG. 3 is shown merely for illustrative purpose. The communication method of a transaction from the SFA system 30 to the SCM system 20, and the communication method of a transaction from the ERP system 10 to the SFA system 30, and the like are not defined. However, collaboration between these systems should be defined, if required. The communication method also includes a batch method in which a unified amount of data is communicated at predetermined time, in addition to the above-mentioned real method and delayed batch method.

The above-mentioned transaction is a generic name for data transmitted among systems, which is a concept containing arbitrary data such as a character string and a file.

Figure 4:
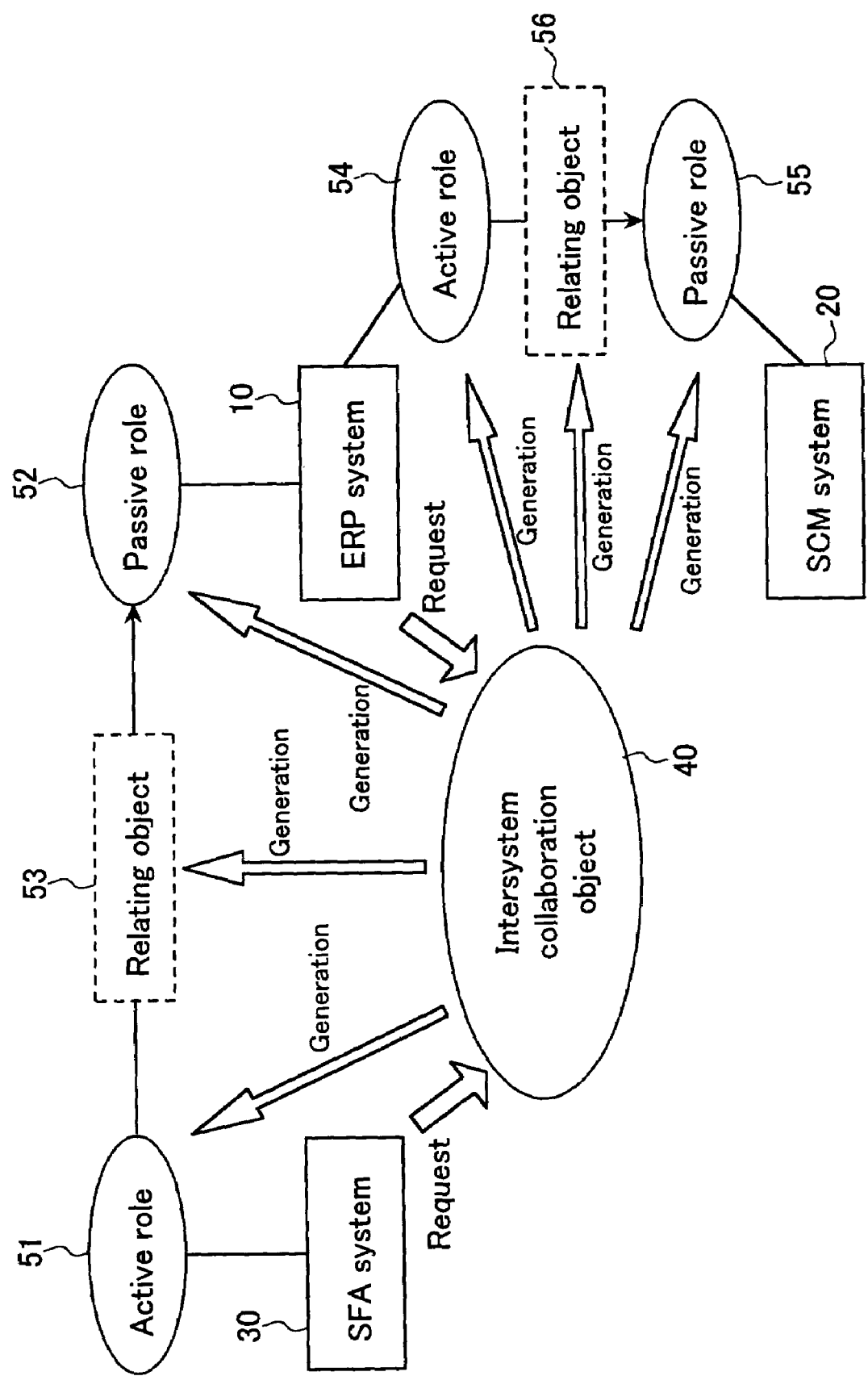
FIG. 4 is a schematic diagram showing a state of intersystem collaboration processing in the integrated information processing system.
Figure 5:
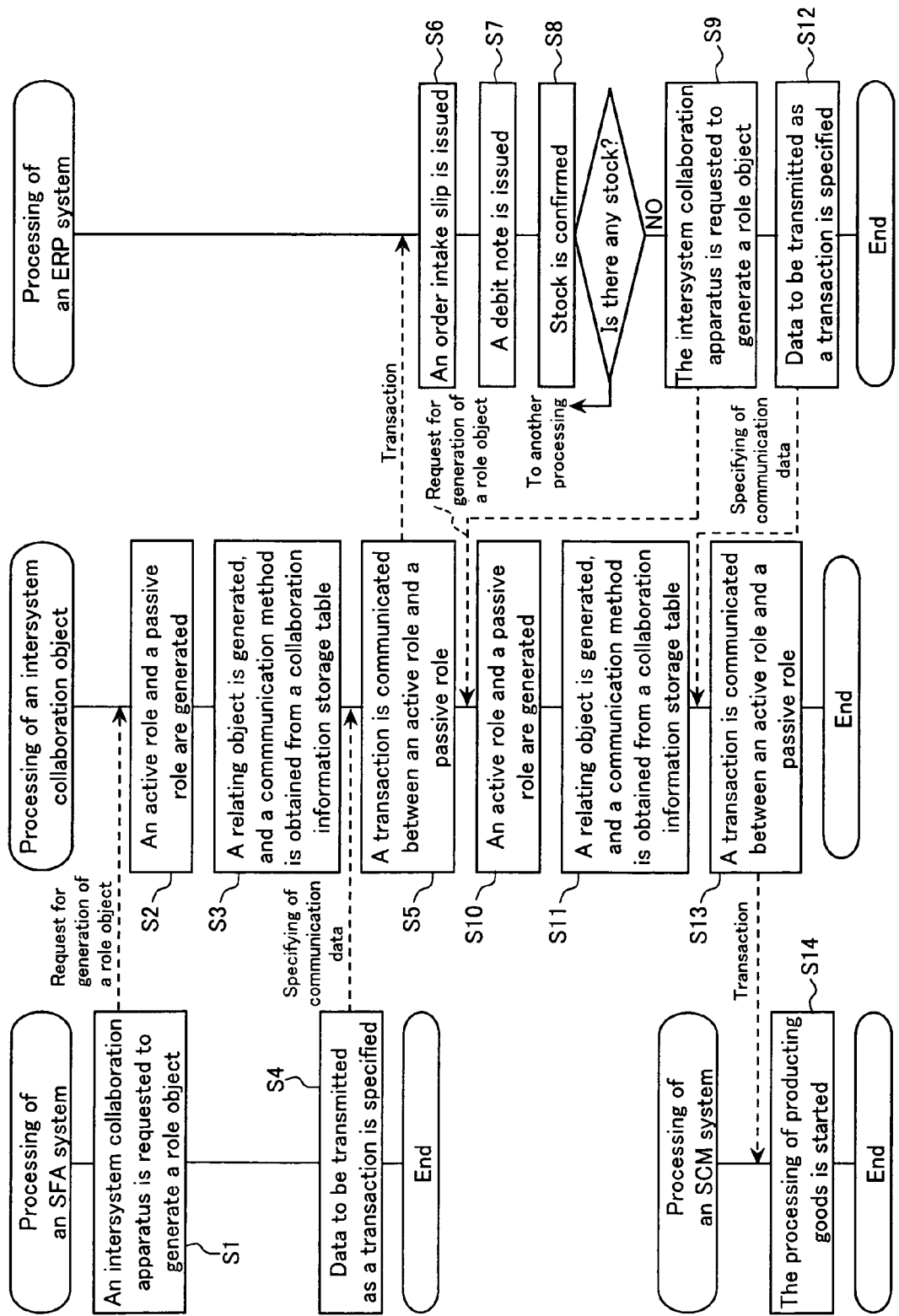
FIG. 5 is a flow chart showing a procedure of the intersystem collaboration processing.

Hereinafter, intersystem collaboration processing in the integrated information processing system will be described with reference to FIGS. 4 and 5.

First, when a person in charge of business receives an order for goods from a customer in the SFA system 30, the SFA system 30 requests the intersystem collaboration object 40 to generate a role object for collaboration with the ERP system 10 (Step S1).

In the intersystem collaboration object 40 receiving the abovementioned request, the role object generating part 40b generates an active role 51 as an object corresponding to the SFA system 30, and generates a passive role 52 as an object corresponding to the ERP system 10 that is a collaboration target (Step S2). The active role 51 thus generated is an object to be a transmission origin of the transaction, and the passive role 52 is an object to be a transmission target of the transaction.

Furthermore, the relating object generating part 40c of the intersystem collaboration object 40 generates a relating object 53 between the active role 51 and the passive role 52 generated at Step S2 (Step S3). The relating object 53 thus generated conducts collaboration of "transmitting a transaction from the active role 51 to the passive role 52" between the active role 51 and the passive role 52.

Furthermore, the relating object 53 thus generated has a communication method of a transaction as an attribute. For example, in the case of the above-mentioned active role 51 and passive role 52, the active role 51 corresponds to the SFA system 30, and the passive role 52 corresponds to the ERP system 10. Therefore, the relating object generating part 40c allows the table access part 40a to refer to the collaboration information storage table 41, thereby obtaining a "real method" as an attribute of the relating object 53 (Step S3).

Next, the SFA system 30 specifies data which the SFA system 30 desires to transmit as a transaction, with respect to the intersystem collaboration object 40 (Step S4). Herein, data representing the contents of the order received from the customer in the SFA system 30 is specified.

The intersystem collaboration object 40 allows a transaction to be communicated between the active role 51 and the passive role 52 in accordance with the attribute of the relating object 53 (Step S5). Because of this, the data representing the contents of the order received from the customer is transmitted from the active role 51 (SFA system 30) to the passive role 52 (ERP system 10) as a transaction by the real method.

Next, in the ERP system 10 receiving this data, the sales subsystem 10a conducts processing of issuing an order intake slip (Step S6). Furthermore, the accounting subsystem 10b issues a debit note (Step S7). Then, the stock management subsystem 10c confirms the presence/absence of stock of the ordered goods (Step S8).

If there is some stock of the ordered goods (the result of Step S8 is YES), another processing of, for example, issuing a delivery slip and an invoice is conducted. On the other hand, if the stock of the ordered goods has run out (the result of Step S8 is NO), the production collaboration subsystem 10d creates data for requesting the production of the goods, and requests the intersystem collaboration object 40 to generate a role object for collaboration with the SCM system 20 (Step S9).

In the intersystem collaboration object 40 receiving the abovementioned request, the role object generating part 40b generates an active role 54 as an object corresponding to the ERP system 10, and generates a passive role 55 as an object corresponding to the SCM system 20 that is a collaboration target (Step S10). The active role 54 thus generated is an object to be a transmission origin of a transaction, and the passive role 55 is an object to be a transmission target of the transaction.

Furthermore, the relating object generating part 40c of the intersystem collaboration object 40 generates a relating object 56 between the active role 54 and the passive role 55 generated at Step S10 (Step S11). The relating object 56 thus generated conducts collaboration of "transmitting a transaction from the active role 54 to the passive role 55" between the active role 54 and the passive role 55.

Furthermore, the relating object 56 thus generated has a communication method of a transaction as an attribute. For example, in the case of the active role 54 and the passive role 55, the active role 54 corresponds to the ERP system 10, and the passive role 55 corresponds to the SCM system 20. Therefore, the relating object generating part 40c allows the table access part 40a to refer to the collaboration information storage table 41, thereby obtaining a "delayed batch method" as an attribute of the relating object 56 (Step S11).

Next, the ERP system 10 specifies data which the ERP system 10 desires to transmit as a transaction, with respect to the intersystem collaboration object 40 (Step S12). Herein, the data created at Step S9 for requesting the production of out-of-stock goods is specified.

The intersystem collaboration object 40 allows a transaction to be communicated between the active role 54 and the passive role 55 in accordance with the attribute of the relating object 56 (Step S13). Because of this, data for requesting the production of out-of-stock goods is transmitted from the active role 54 to the passive role 55. Regarding this data transmission, the attribute of the relating object 56 is a delayed batch method; therefore, the ERP system 10 accumulates data for requesting the production of out-of-stock goods without depending upon the state of the SCM system 20.

Furthermore, the SCM system 20 receiving data from the ERP system 10 conducts required processing such as acquirement of raw materials for producing the goods asynchronously to the ERP system 10 (Step S14).

Because of the above-mentioned procedure, the integrated information processing system of the present embodiment realizes collaboration between the respective systems.

Herein, FIG. 6 shows an exemplary format of data passed among the systems as a transaction in the integrated information processing system.

As shown in FIG. 6, the data passed as a transaction consists of an attribute tag $T_n$, an update flag $F_n$, and a data part $D_n$ (n is a natural number).

A number representing an attribute of the data part $D_n$ is placed in the attribute tag $T_n$. This number is common in the integrated information processing system and defined as follows: for example, in the case where the attribute of data of the data part $D_n$ is a user ID, "1" is placed in the attribute tag $T_n$; in the case where the attribute of data of the data part $D_n$ is a user name, "2" is placed in the attribute tag $T_n$.

Furthermore, a number representing the acceptance/rejection of an update of the contents of the data part $D_n$ in the system of a transmission target of the transaction is placed in the update flag $F_n$. This number is also common in the integrated information processing system and defined as follows: for example, in the case where an update of the data part $D_n$ is required in the system of the transmission target, "1" is placed in the update flag $F_n$; in the case where the data part $D_n$ may be updated if required, "2" is placed in the update flag $F_n$; in the case where an update of the data part $D_n$ is prohibited, "3" is placed in the update flag $F_n$.

As described above, in the integrated information processing system of the present embodiment, the SFA system 10, the SCM system 20, or the like which attempts to transmit data for collaboration with another system makes a request of the intersystem collaboration object 40 for collaboration with another system, instead of directly transmitting data to a system of a collaboration target by using file transfer as in the prior art. At this time, the intersystem collaboration object 40 generates role objects respectively corresponding to a system of a transmission origin and a system of a transmission target, and generates a relating object representing the relationship between the role objects, thereby realizing collaboration between two systems.

Because of this, each system in the integrated information processing system can transmit data without awareness of the architecture of a system of a collaboration target. Furthermore, the processing of generation of an object for conducting collaboration between systems is centralized at the intersystem collaboration object 40. Therefore, in the case where collaboration between systems is changed, or a new system is added, the intersystem collaboration object 40 may merely be corrected. As a result, a plurality of information processing systems can be combined without awareness of the difference in architecture among these information processing systems, and a burden for integrating systems and configuring an inter-company collaboration system can be reduced.

In the above-mentioned description, the case has been described in which, when each system requires collaboration with another system, each system autonomously requests the intersystem collaboration object 40 to generate a role object. However, the present invention is not limited thereto. It may also be possible that intersystem collaboration information is previously registered in the collaboration information storage table 41 in the order of transmission of transactions, and the intersystem collaboration object 40 refers to the collaboration information to successively transmit transactions.

EMBODIMENT 2

Hereinafter, the present invention will be described by way of another embodiment with reference to the drawings.

In the integrated information processing system of the present embodiment, the processing of the intersystem collaboration object 40 described in Embodiment 1 is also applied to the collaboration between subsystems in the ERP system 10. More specifically, in the present embodiment, information processing means collaborate with each other on a subsystem basis.

More specifically, the collaboration information storage table 41 referred to by the intersystem collaboration object 40 in Embodiment 2 stores collaboration information among subsystems of the ERP system 10, in addition to the collaboration information among the ERP system 10, the SCM system 20, and the SFA system 30, as exemplified in FIG. 7.

In the example shown in FIG. 7, a "real method" is defined as an attribute of a relating object for collaboration from the sales subsystem 10a to the accounting subsystem 10b, a "real method" is defined as an attribute of a relating object for collaboration from the accounting subsystem 10b to the stock management subsystem 10c, and a "batch method" is defined as an attribute of a relating object for collaboration from the stock management subsystem 10c to the production collaboration subsystem 10d. In the same way as in FIG. 3, the example in FIG. 7 is merely shown for illustrative purpose. Collaboration between any subsystems can be defined, if required.

Figure 8:
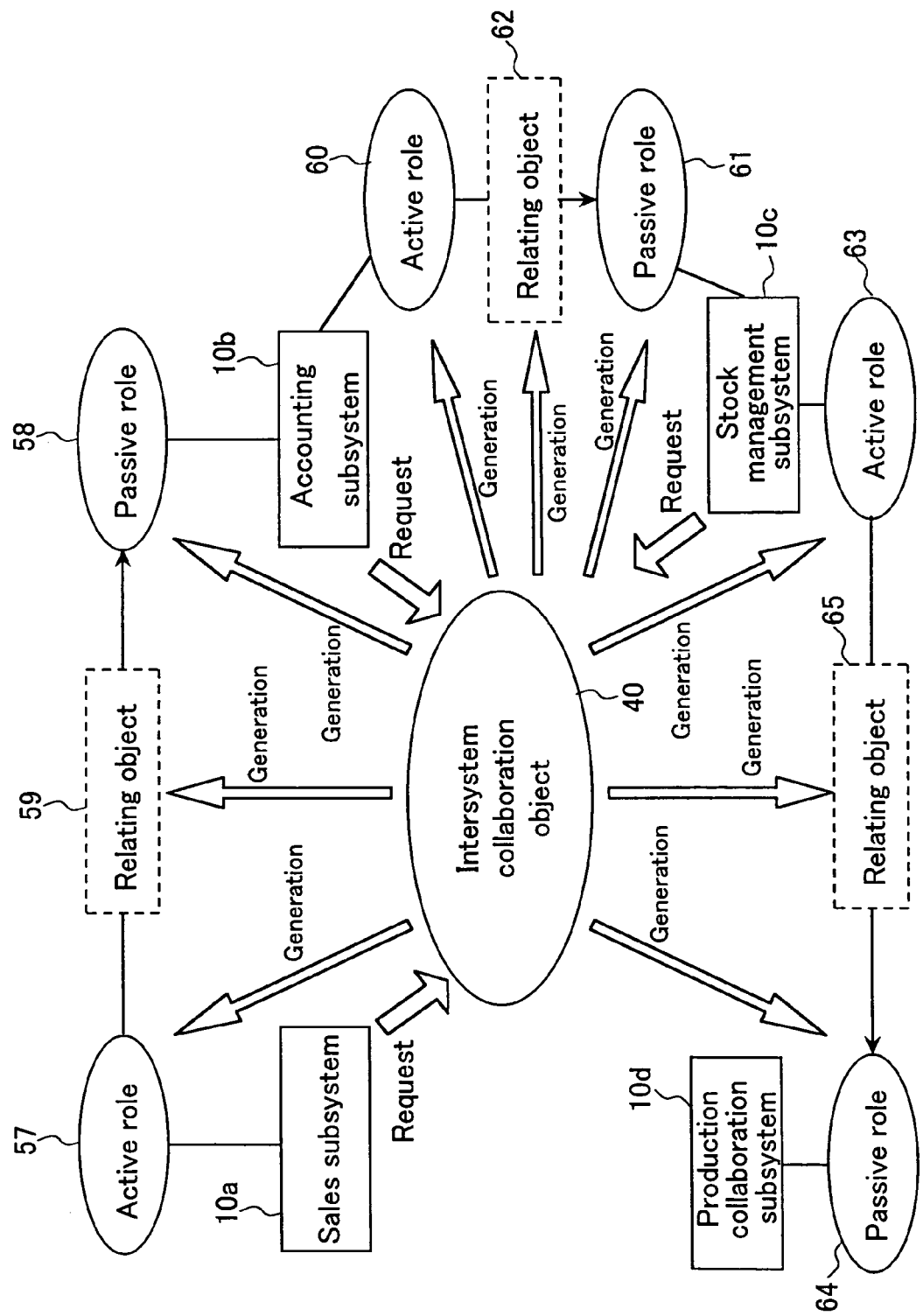
FIG. 8 is a schematic diagram showing a state of intersystem collaboration processing in the integrated information processing system of Embodiment 2.
Figure 9:
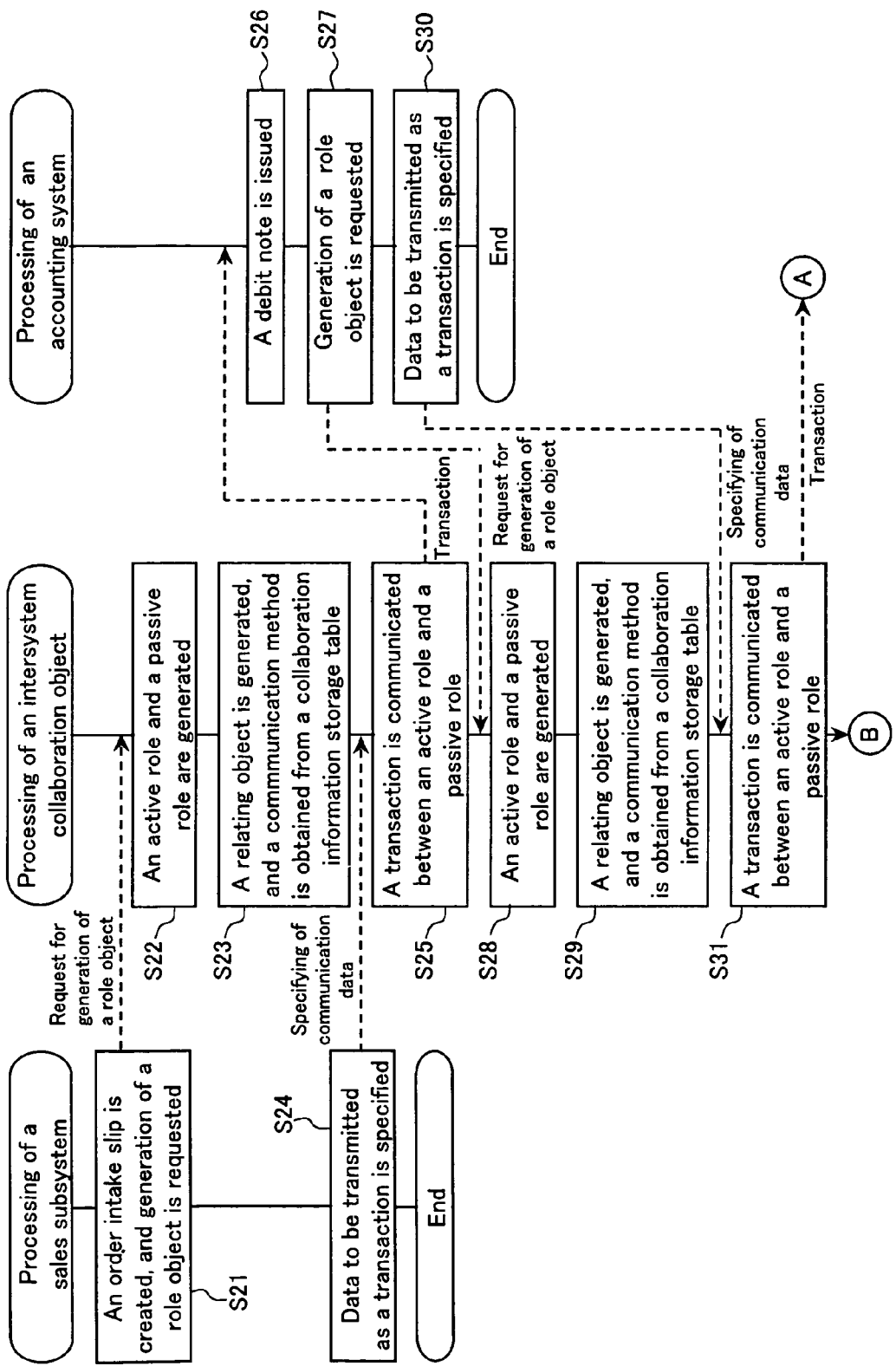
FIG. 9 is a flow chart showing a partial procedure of the intersystem collaboration processing in the integrated information processing system of Embodiment 2.
Figure 10:
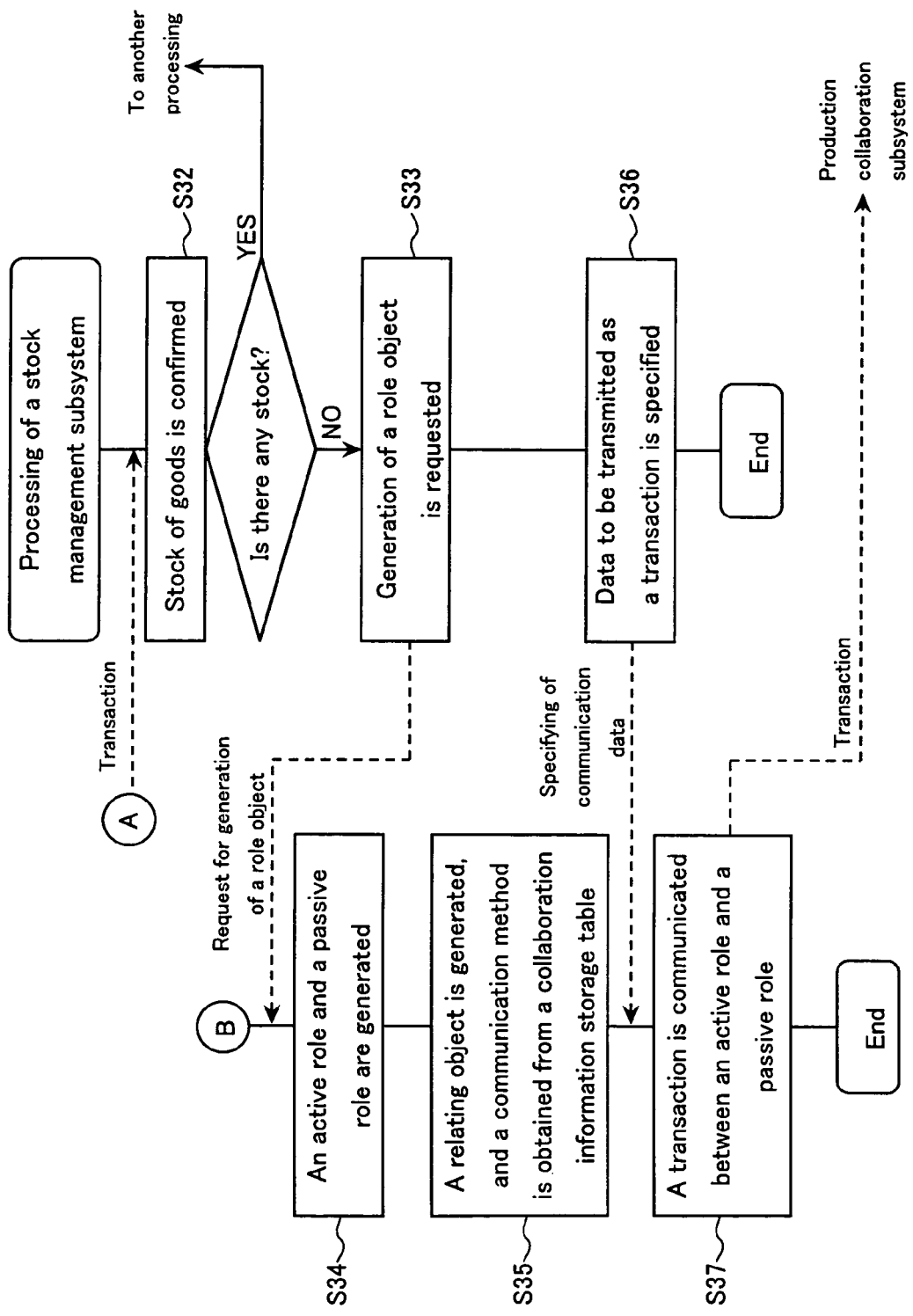
FIG. 10 is a flow chart showing a continuation of the processing procedure shown in the flow chart in FIG. 9.

Herein, a processing procedure for collaboration between subsystems of the ERP system 10 through the intersystem collaboration object 40 will be described with reference to FIGS. 8 to 10. This processing corresponds to the internal processings at Steps S6 to S9 in the flow chart of FIG. 5 described in Embodiment 1.

In the ERP system 10, upon receiving data representing the contents of an order from a customer from the SFA system 30, the sales subsystem 10a creates an order intake slip based on this data, and requests the intersystem collaboration object 40 to generate a role object for collaboration with the accounting subsystem 10b (Step S21).

In the intersystem collaboration object 40 receiving the abovementioned request, the role object generating part 40b generates an active role 57 as an object corresponding to the sales subsystem 10a, and generates a passive role 58 as an object corresponding to the accounting subsystem 10b that is a collaboration target (Step S22). The active role 57 thus generated is an object to be a transmission origin of a transaction, and the passive role 58 is an object to be a transmission target of the transaction.

Furthermore, the relating object generating part 40c of the intersystem collaboration object 40 generates a relating object 59 between the active role 57 and the passive role 58 generated at Step S22 (Step S23). The relating object 59 thus generated conducts collaboration of "transmitting a transaction from the active role 57 to the passive role 58" between the active role 57 and the passive role 58.

Furthermore, the relating object 59 thus generated has a communication method of a transaction as an attribute. For example, in the case of the above-mentioned active role 57 and passive role 58, the active role 57 corresponds to the sales subsystem 10a, and the passive role 58 corresponds to the accounting subsystem 10b. Therefore, the relating object generating part 40c instructs the table access part 40a to refer to the collaboration information storage table 41 shown in FIG. 7, thereby obtaining a "real method" as an attribute of the relating object 59 (Step S23).

Next, the sales subsystem 10a specifies data which the sales subsystem 10a desires to transmit as a transaction, with respect to the intersystem collaboration object 40 (Step S24). Herein, the contents of the above-mentioned order intake slip is specified. At this time, the sales subsystem 10a issues an order intake slip. This processing corresponds to Step S6 in FIG. 5.

The intersystem collaboration object 40 allows a transaction to be communicated between the active role 57 and the passive role 58 in accordance with the attribute of the relating object 59 (Step S25). Because of this, the data representing the contents of the order intake slip is transmitted from the active role 57 to the passive role 58 as a transaction by the real method.

Next, the accounting subsystem 10b receiving the transaction issues a debit note based on the order intake slip transmitted from the sales subsystem 10a by the transaction (Step S26). Step S26 corresponds to Step S7 in FIG. 5.

Furthermore, in order to confirm the presence/absence of stock of the ordered goods, the accounting subsystem 10b requests the intersystem collaboration object 40 to generate a role object for collaboration with the stock management subsystem 10c (Step S27).

In the intersystem collaboration object 40 receiving the abovementioned request, the role object generating part 40b generates an active role 60 as an object corresponding to the accounting subsystem 10b, and generates a passive role 61 as an object corresponding to the stock management subsystem 10c that is a collaboration target (Step S28). The active role 60 thus generated is an object to be a transmission origin of a transaction, and the passive role 61 is an object to be a transmission target of a transaction.

Furthermore, the relating object generating part 40c of the intersystem collaboration object 40 generates a relating object 62 between the active role 60 and the passive role 61 generated at Step S28 (Step S29). The relating object 62 thus generated conducts collaboration of "transmitting a transaction from the active role 60 to the passive role 61" between the active role 60 and the passive role 61.

Furthermore, the relating object 62 thus generated has a communication method of a transaction as an attribute. For example, in the case of the above-mentioned active role 60 and passive role 61, the active role 60 corresponds to the accounting subsystem 10b, and the passive role 61 corresponds to the stock management subsystem 10c. Therefore, the relating object generating part 40c instructs the table access part 40a to refer to the collaboration information storage table 41, thereby obtaining a "real method" as an attribute of the relating object 62 (Step S29).

Next, the accounting subsystem 10b specifies data which the accounting subsystem 10b desires to transmit as a transaction, with respect to the intersystem collaboration object 40 (Step S30). Herein, the contents of the debit note created at Step S26 is specified.

The intersystem collaboration object 40 allows a transaction to be communicated between the active role 60 and the passive role 61 in accordance with the attribute of the relating object 62 (Step S31). Because of this, the contents of the debit note is transmitted from the active role 60 to the passive role 61. This data transmission is conducted immediately since the attribute of the relating object 62 is a real method.

Upon receiving the transaction from the accounting subsystem 10b, the stock management subsystem 10c checks the stock of the goods based on the contents of the debit note transmitted as the transaction (Step S32). Step S32 corresponds to Step S8 in FIG. 5.

In the case where the stock of the ordered goods has run out, the stock management subsystem 10c requests the intersystem collaboration object 40 to generate a role object for collaboration with the production collaboration subsystem 10d (Step S33).

In the intersystem collaboration object 40 receiving the abovementioned request, the role object generating part 40b generates an active role 63 as an object corresponding to the stock management subsystem 10c, and generates a passive role 64 as an object corresponding to the production collaboration subsystem 10d that is a collaboration target (Step S34). The active role 63 thus generated is an object to be a transmission origin of a transaction, and the passive role 64 is an object to be a transmission target of a transaction.

Furthermore, the relating object generating part 40c of the intersystem collaboration object 40 generates a relating object 65 between the active role 63 and the passive role 64 generated at Step S34 (Step S35). The relating object 65 thus generated conducts collaboration of "transmitting a transaction from the active role 63 to the passive role 64" between the active role 63 and the passive role 64.

Furthermore, the relating object 65 thus generated has a communication method of a transaction as an attribute. For example, in the case of the above-mentioned active role 63 and passive role 64, the active role 63 corresponds to the stock management subsystem 10c, and the passive role 64 corresponds to the production collaboration subsystem 10d. Therefore, the relating object generating part 40c instructs the table access part 40a to refer to the collaboration information storage table 41 shown in FIG. 7, thereby obtaining a "batch method" as an attribute of the relating object 65 (Step S35).

Next, the stock management subsystem 10c specifies data which the stock management subsystem 10c desires to transmit as a transaction, with respect to the intersystem collaboration object 40 (Step S36). Herein, data on the goods whose stock is found to have run out during checking of stock at Step S32 is specified.

The intersystem collaboration object 40 allows a transaction to be communicated between the active role 63 and the passive role 64 in accordance with the attribute of the relating object 65 (Step S37). Because of this, the data on goods whose stock is found to have run out is transmitted from the active role 63 to the passive role 64. This data transmission is conducted at predetermined time since the attribute of the relating object 65 is a batch method.

After the data transmission is conducted, the production collaboration subsystem 10d corresponding to the passive role 64 starts required processing such as preparation for production, based on the data, transmitted as a transaction, on goods whose stock is found to have run out.

As described above, in the integrated information processing system of the present embodiment, each subsystem makes a request of the intersystem collaboration object 40 for collaboration with another subsystem, instead of directly transmitting data to a subsystem of a collaboration target. At this time, the intersystem collaboration object 40 generates role objects respectively corresponding to a subsystem of a transmission origin and a subsystem of a transmission target, and generates a relating object representing the relationship between the role objects, thereby realizing collaboration between two subsystems.

Because of this, each subsystem in the integrated information processing system can transmit data without awareness of the architecture of a subsystem of a collaboration target. Furthermore, the processing of generation of an object for conducting collaboration between subsystems is centralized at the intersystem collaboration object 40. Therefore, in the case where collaboration between subsystems is changed, or a new subsystem is added, the intersystem collaboration object 40 may merely be corrected. As a result, a plurality of subsystems can be combined without awareness of the difference in architecture among these subsystems.

In the above-mentioned description, the case has been described in which the collaboration information storage table 41 of the present embodiment stores collaboration information among systems such as the ERP system 10 and collaboration information among subsystems in parallel. However, it may also be possible to provide another collaboration information storage table in accordance with the granularity of systems.

Furthermore, in the above-mentioned description, the case has been described in which, when each subsystem requires collaboration with another subsystem, each subsystem autonomously requests the intersystem collaboration object 40 to generate a role object. However, the present invention is not limited thereto. It may also be possible that collaboration information between subsystems is previously registered in the collaboration information storage table 41 in the order of transmission of transactions, and the intersystem collaboration object 40 refers to the collaboration information to successively transmit transactions.

Furthermore, in the above-mentioned description, the case has been described in which the subsystems in the identical system (ERP system 10) collaborate with each other. However, it may also be possible that subsystems in different systems collaborate with each other.

EMBODIMENT 3

Hereinafter, the present invention will be described by way of still another embodiment with reference to the drawings.

In the integrated information processing system of the present embodiment, the processing of the intersystem collaboration object 40 described in Embodiments 1 and 2 is also applied to the collaboration between programs. More specifically, in the present embodiment, the information processing means collaborate with each other on a program basis.

Figure 11:
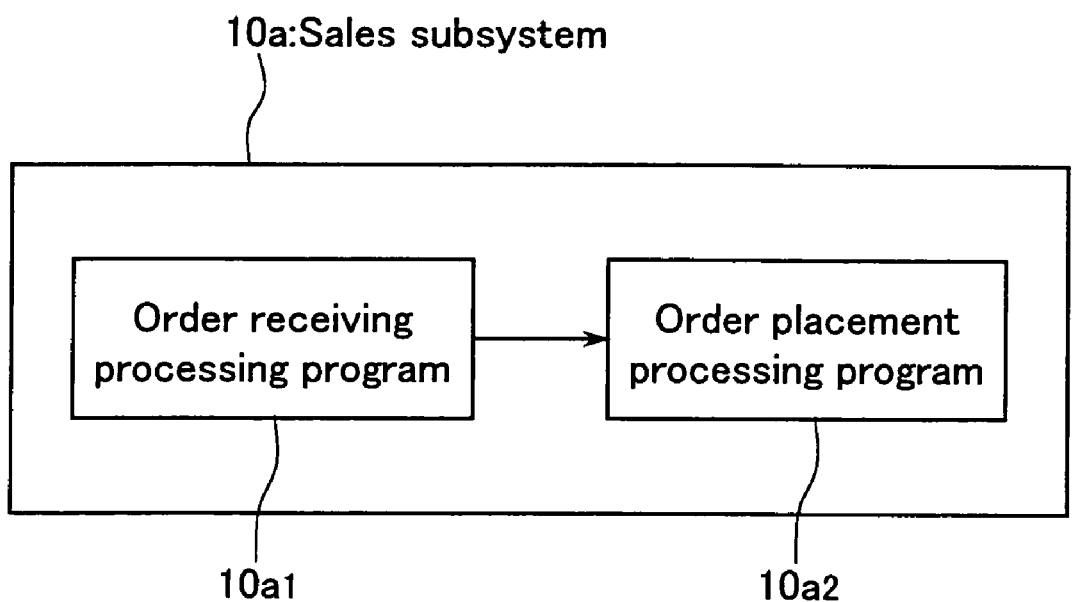
FIG. 11 is a block diagram showing an exemplary program as a collaboration information processing procedure in the integrated information processing system of Embodiment 3 according to the present invention.

Herein, as an example, as shown in FIG. 11, only the collaboration between an order receiving processing program $10a_1$ and an order placement processing program $10a_2$ operated on the sales subsystem 10a of the ERP system 10 will be described.

The collaboration information storage table 41 referred to by the intersystem collaboration object 40 in Embodiment 3 contains collaboration information defining the collaboration between the order receiving processing program $10a_1$ and the order placement processing program $10a_2$ as shown in FIG. 12.

In the example shown in FIG. 12, a "real method" is defined as an attribute of a relating object for collaboration from the order receiving program $10a_1$ to the order placement processing program $10a_2$.

Figure 13:
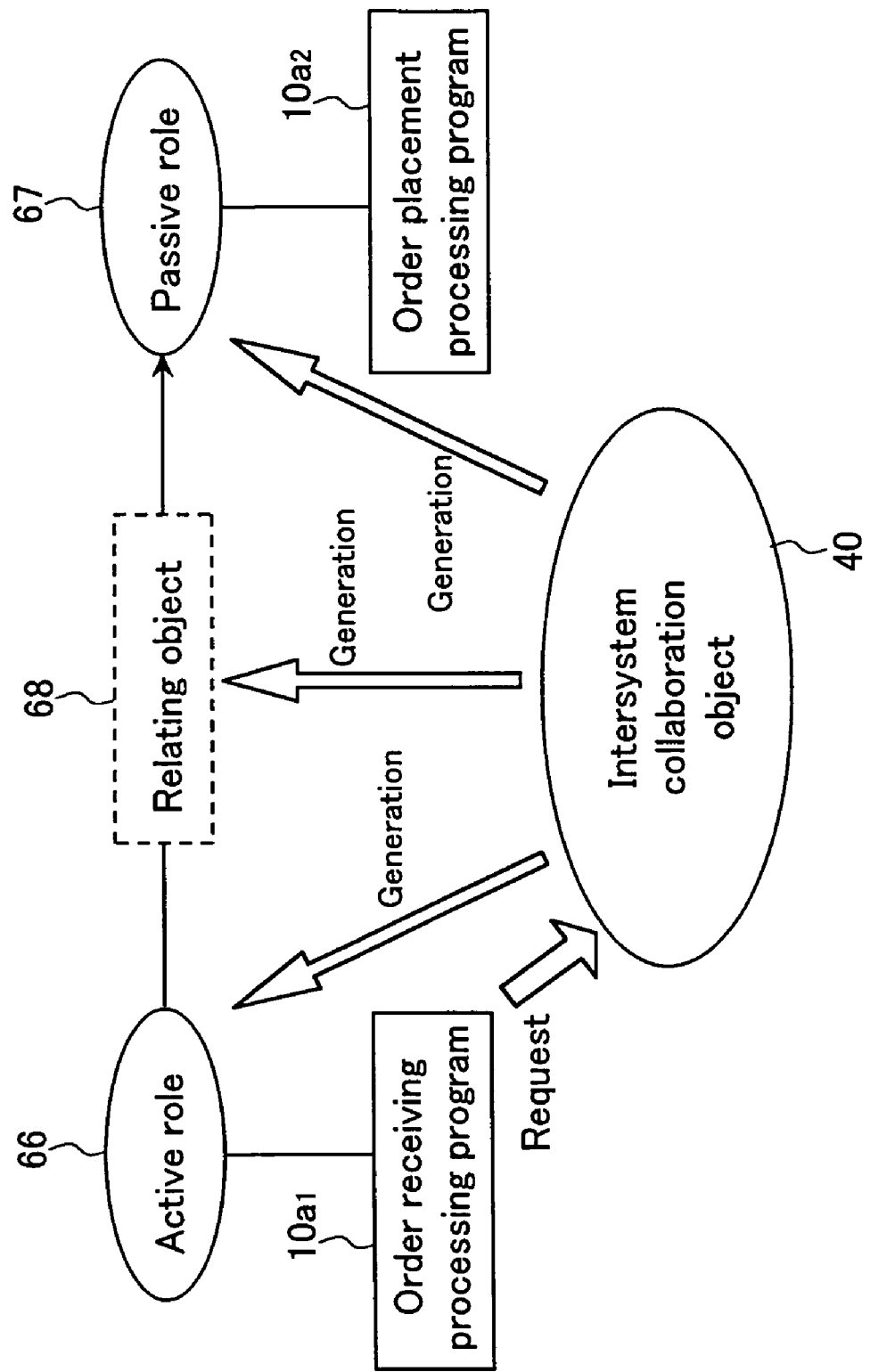
FIG. 13 is a schematic diagram showing a state of intersystem collaboration processing in the integrated information processing system of Embodiment 3.
Figure 14:
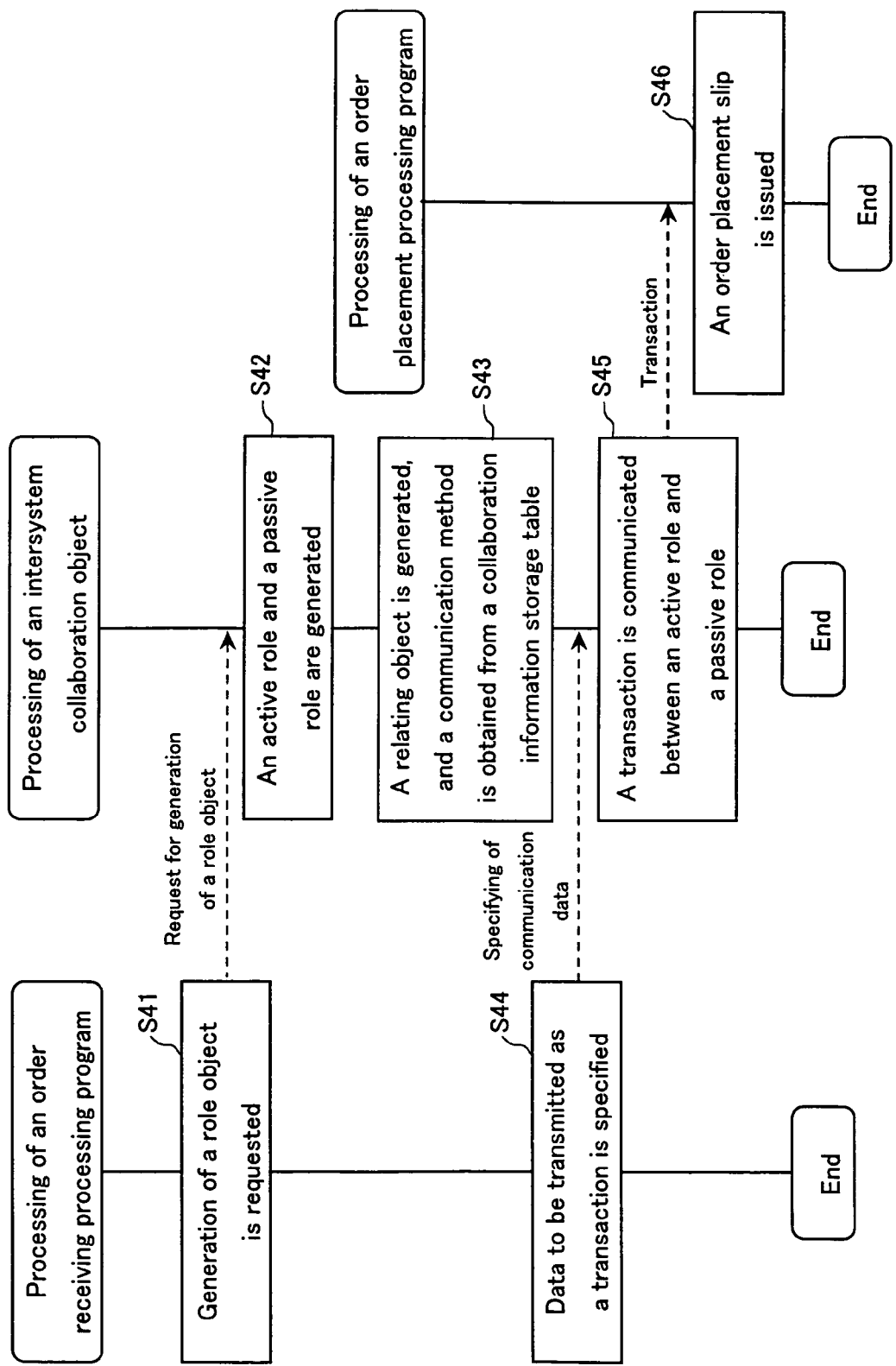
FIG. 14 is a flow chart showing a procedure of intersystem collaboration processing in the integrated information processing system of Embodiment 3.

Herein, a processing procedure for collaboration between programs through the intersystem collaboration object 40 will be described with reference to FIGS. 13 and 14.

In the sales subsystem 10a of the ERP system 10, upon receiving data representing the contents of an order from a customer from the SFA system 30, the order receiving processing program $10a_1$ creates an order intake slip based on this data, and requests the intersystem collaboration object 40 to generate a role object for collaboration with the order placement processing program $10a_2$ (Step S41).

In the intersystem collaboration object 40 receiving the abovementioned request, the role object generating part 40b generates an active role 66 as an object corresponding to the order receiving processing program $10a_1$, and generates a passive role 67 as an object corresponding to the order placement processing program $10a_2$ that is a collaboration target (Step S42). The active role 66 thus generated is an object to be a transmission origin of a transaction, and the passive role 67 is an object to be a transmission target of the transaction.

Furthermore, the relating object generating part 40c of the intersystem collaboration object 40 generates a relating object 68 between the active role 66 and the passive role 67 generated at Step S42 (Step S43). The relating object 68 thus generated conducts collaboration of "transmitting a transaction from the active role 66 to the passive role 67" between the active role 66 and the passive role 67.

Furthermore, the relating object 68 thus generated has a communication method of a transaction as an attribute. For example, in the case of the above-mentioned active role 66 and passive role 67, the relating object generating part 40c instructs the table access part 40a to refer to the collaboration information storage table 41 shown in FIG. 12, thereby obtaining a "real method" as an attribute of the relating object 68 (Step S43).

Next, the order receiving processing program $10a_1$ specifies data which the order receiving processing program $10a_1$ desires to transmit as a transaction, with respect to the intersystem collaboration object 40 (Step S44). Herein, the contents of the above-mentioned order receiving slip created at Step S41 is specified.

The intersystem collaboration object 40 allows a transaction to be communicated between the active role 66 and the passive role 67 in accordance with the attribute of the relating object 68 (Step S45). Herein, as described above, since the attribute of the relating object 68 is a real method, the data representing the contents of the order intake slip is immediately transmitted from the active role 66 to the passive role 67.

As described above, in the present embodiment, the collaboration between programs is also conducted through the intersystem collaboration object 40, instead of being conducted directly therebetween. Because of this, the collaboration between programs can be easily realized without awareness of the difference in interface between programs.

In the above-mentioned description, the case has been described in which the programs in the identical subsystem collaborate with each other. However, it may also be possible that programs collaborate with each other between different subsystems or between different systems. Furthermore, FIG. 12 illustrates only the collaboration information between programs. However, this collaboration information may be stored in the collaboration information storage table 41, in parallel with the intersystem collaboration information shown in FIG. 3 and the collaboration information among subsystems shown in FIG. 7, or may be stored in a separate table.

Furthermore, in the above-mentioned description, the case has been described in which, when each program requires collaboration with another program, each program autonomously requests the intersystem collaboration object 40 to generate a role object. However, the present invention is not limited thereto. It may also be possible that collaboration information between programs is previously registered in the collaboration information storage table 41 in the order of transmission of transactions, and the intersystem collaboration object 40 refers to the collaboration information to successively transmit transactions.

EMBODIMENT 4

Hereinafter, the present invention will be described by way of still another embodiment with reference to the drawings.

Figure 15:
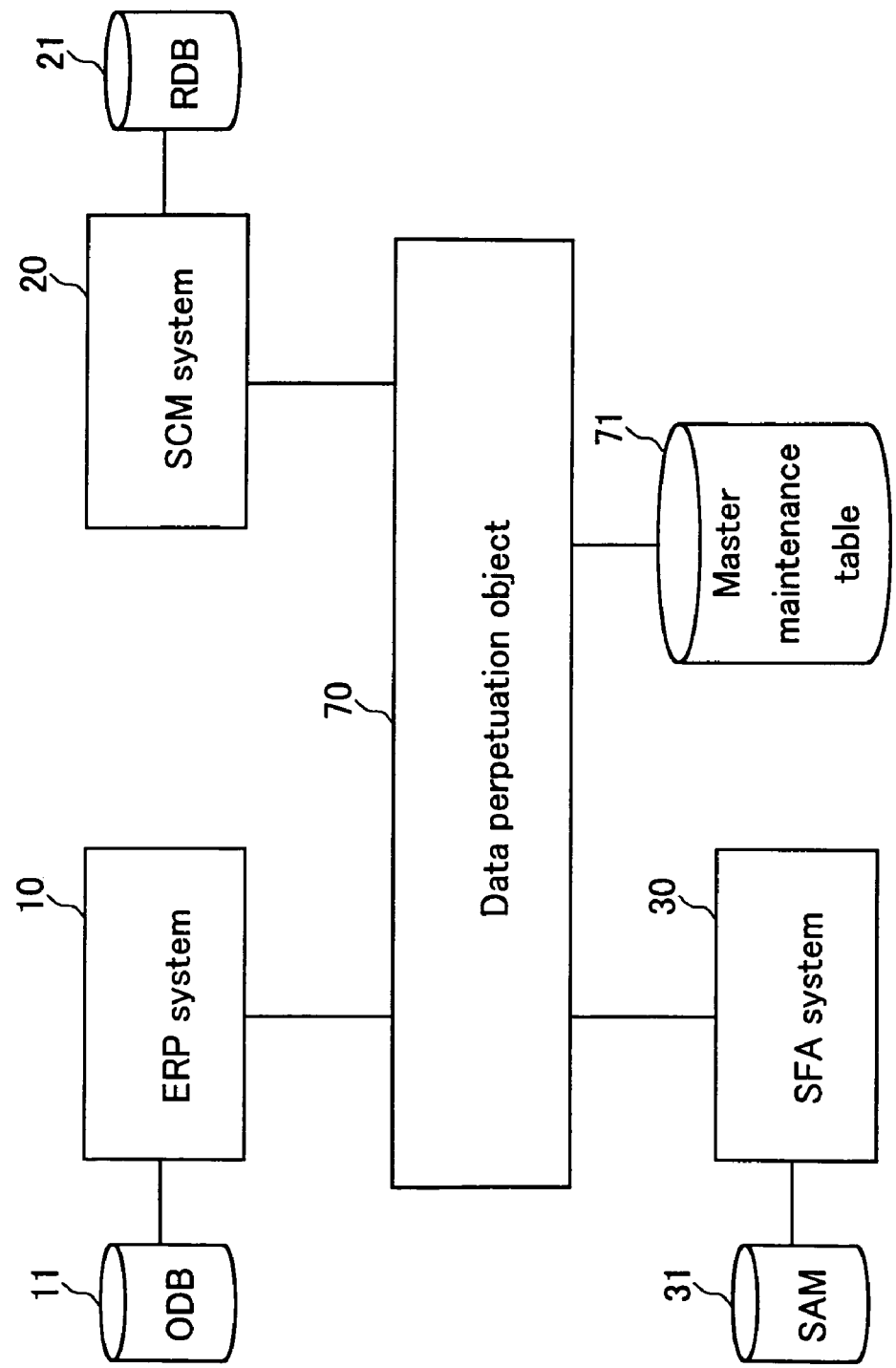
FIG. 15 is a block diagram showing a schematic configuration of an integrated information processing system of Embodiment 4 according to the present invention.

As shown in FIG. 15, an integrated information processing system of the present embodiment has a configuration in which the ERP system 10, the SCM system 20, and the SFA system 30 are combined through a data perpetuation object 70. The ERP system 10 includes an ODB (object database) 11 as a storage apparatus. The SCM system 20 includes an RDB (relational database) 21. The SFA system 30 includes an SAM (sequential access method file) 31. The storage apparatus of each system is not limited to the above.

The ODB 11, the RDB 21, and the SAM 31 hold duplicate data. In the case where duplicate data is updated in either of the systems, in order to maintain the consistency of the data, it is required to update the data in another system.

In the integrated information processing system of the present embodiment, the data perpetuation object 70 conducts unified management of data that is managed by each system in duplicate. Hereinafter, the procedure thereof will be described.

As shown in FIG. 15, in the integrated information processing system, the data perpetuation object 70 has a master maintenance table 71 (collaboration information storage means) for reference during unified management of data.

As shown in FIG. 16, the master maintenance table 71 stores data defining a path for transmitting data to be updated from a system to another system and a communication method of the data transmission. In the example shown in FIG. 16, it is defined that updated data is transmitted from the ERP system 10 to the SCM system 20 by a real method, and updated data is transmitted from the SCM system 20 to the SFA system 30 by a delayed batch method. The path and the communication method shown herein are examples. Any communication method may be defined for a path between any systems, depending upon the relationship between the systems.

Figure 17:
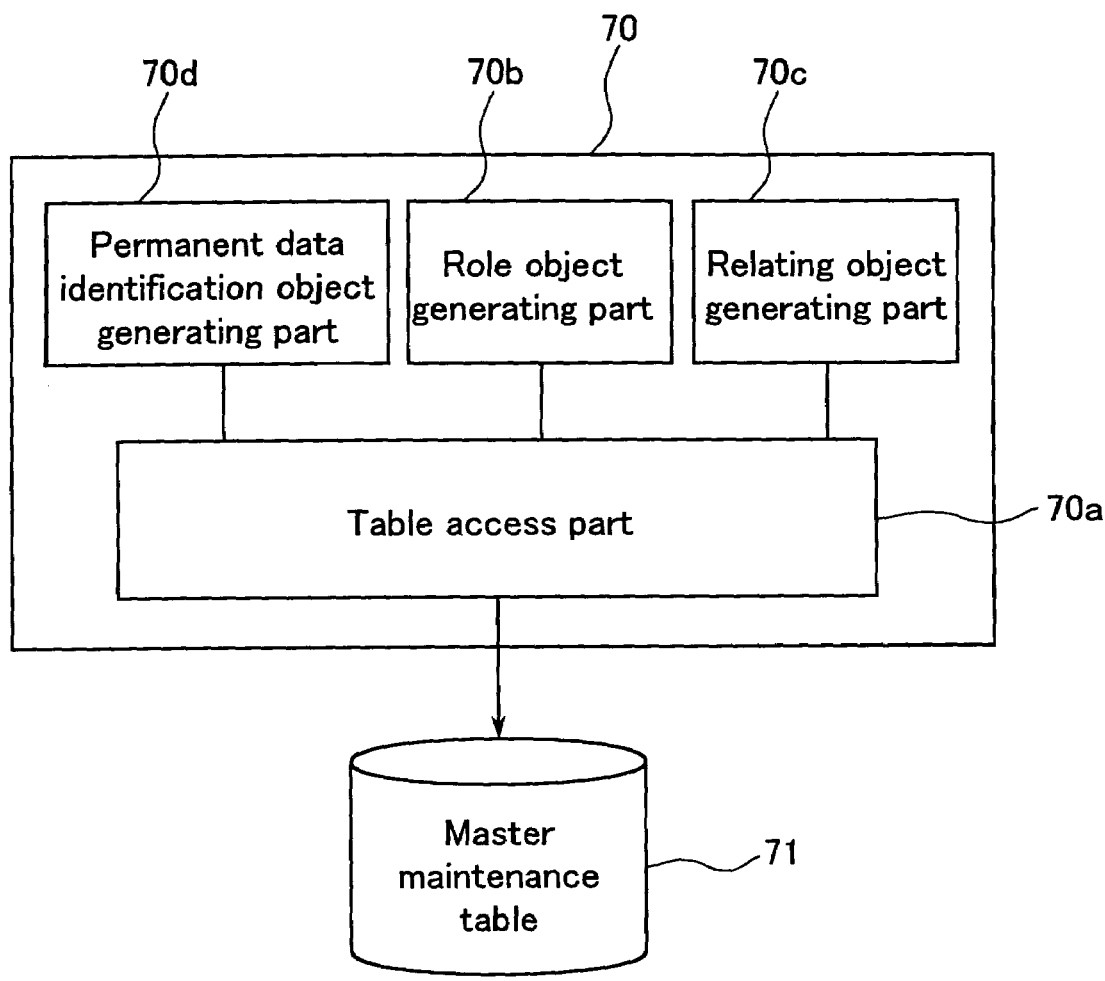
FIG. 17 is a block diagram showing a schematic configuration of a collaboration apparatus between information processing systems provided in the integrated information processing system of Embodiment 4.

Referring to FIG. 17, the data perpetuation object 70 includes a table access part 70a for accessing the master maintenance table 71 to obtain collaboration information therefrom, a role object generating part 70b (role object generating means) for generating a role object, a relating object generating part 70c (relating object generating means) for generating a relating object for collaboration between role objects, and a permanent data identification object generating part 70d (information identification object generating means) for generating a permanent data identification object (information identification object) described later.

Figure 18:
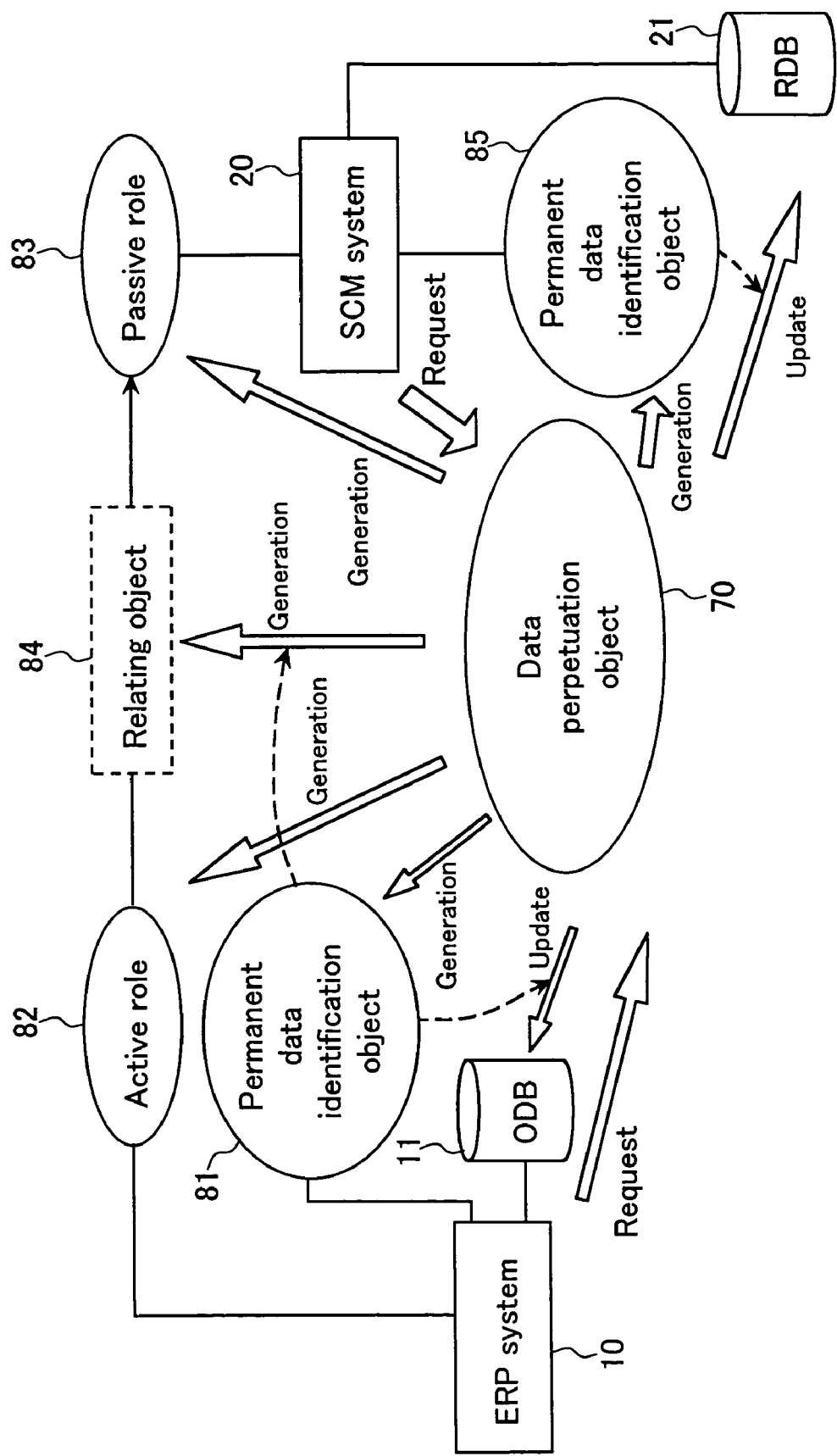
FIG. 18 is a schematic diagram showing a state of intersystem collaboration processing in the integrated information processing system of Embodiment 4.
Figure 19:
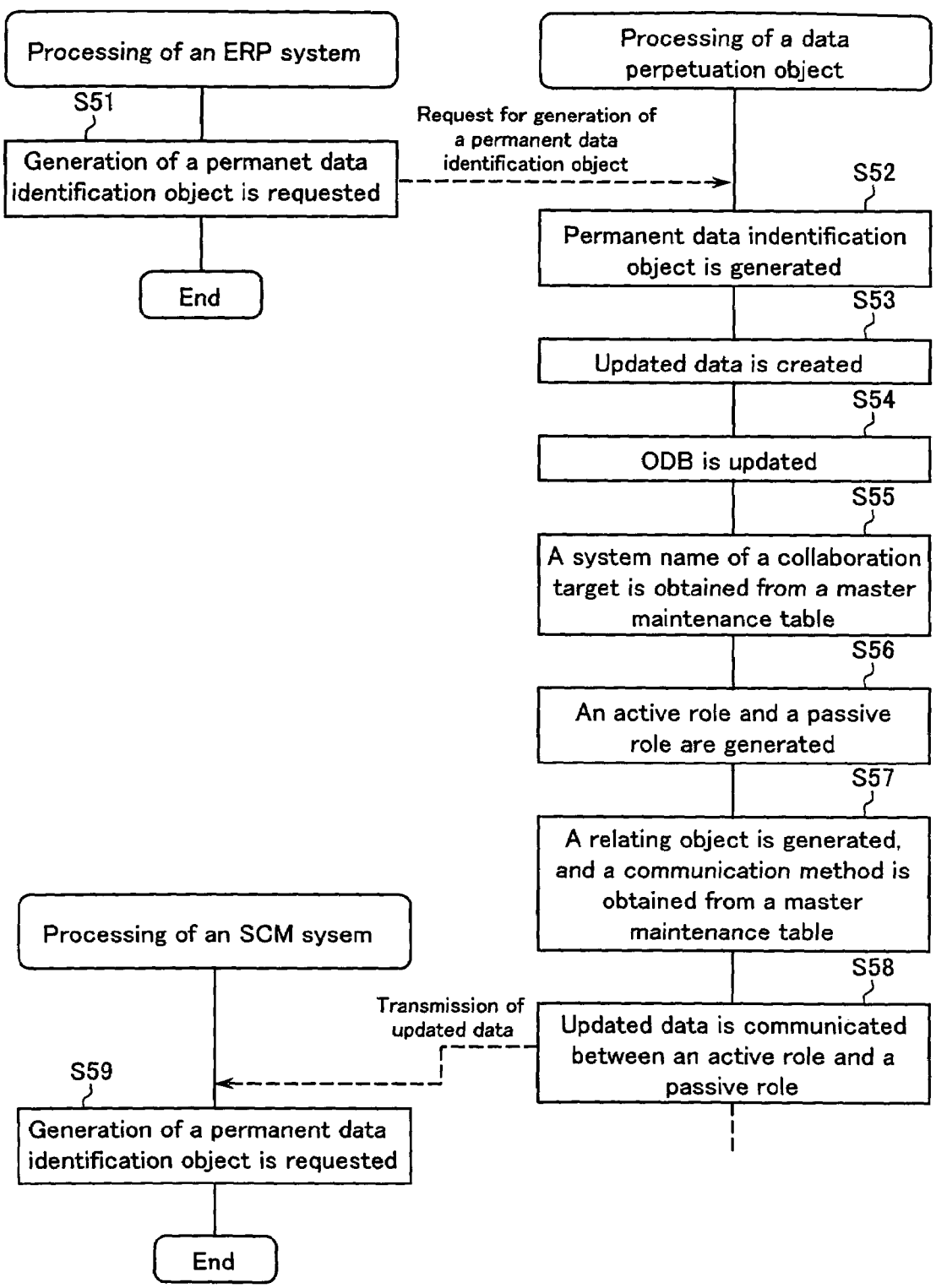
FIG. 19 is a flow chart showing a procedure of intersystem collaboration processing in the integrated information processing system of Embodiment 4.

Herein, a procedure of unified management of data perpetuation in the integrated information processing system will be described with reference to FIGS. 18 and 19. Herein, the data perpetuation refers to processing of storing data in a non-volatile magnetic disk apparatus or the like.

First, in the case where it is required to update data in the ODB 11 in the middle of or at the end of processing, the ERP system 10 requests the data perpetuation object 70 to generate a permanent data identification object, using information on a data storage target as arguments (Step S51). In this case, as the information on a data storage target, the information that a storage target is the ODB 11, the attribute of the ODB 11, and the like are given as arguments.

In the data perpetuation object 70 receiving the above-mentioned request, the permanent data identification object generating part 70d generates a permanent data identification object 81, using the information on a data storage target given as arguments (Step S52).

The data perpetuation object 70 sets data to be updated with respect to the generated permanent data identification object 81, in accordance with the information on a data storage target (Step S53). Herein, it can be determined whether or not data is required to be updated, based on an update flag $F_n$ contained in the data, for example, as described in Embodiment 1 with reference to FIG. 6.

Next, the data perpetuation object 70 updates the ODB 11 in accordance with the contents set in the permanent data identification object 81 (Step S54).

Then, the table access part 70a of the data perpetuation object 70 refers to the master maintenance table 71, and obtains the name of a system that needs to collaborate, i.e., the name of a system to which the updated data should be transmitted (Step S55).

Next, the role object generating part 70b of the data perpetuation object 70 generates an active role 82 as an object corresponding to the ERP system 10, and generates a passive role 83 as an object corresponding to the SCM system 20 that is a collaboration target (Step S56).

Furthermore, the relating object generating part 70c of the data perpetuation object 70 generates a relating object 84 between the active role 82 and the passive role 83 generated at Step S56 (Step S57). The relating object 84 thus generated conducts collaboration of "transmitting updated data from the active role 82 to the passive role 83" between the active role 82 and the passive role 83.

Furthermore, the relating object 84 thus generated has a communication method of updated data as an attribute. For example, in the case of the above-mentioned active role 82 and passive role 83, the active role 82 corresponds to the ERP system 10, and the passive role 83 corresponds to the SCM system 20. Therefore, the relating object generating part 70c allows the table access part 70a to refer to the master maintenance table 71, thereby obtaining a "real method" as an attribute of the relating object 84 (Step S57).

The data perpetuation object 70 allows updated data to be communicated between the active role 82 and the passive role 83 in accordance with the attribute of the relating object 84 (Step S59). In this case, the attribute of the relating object 84 is a "real method" as described above, so that the updated data is immediately transmitted from the active role 82 (ERP system 10) to the passive role 83 (SCM system 20).

When the updated data is transmitted from the ERP system 10, the SCM system 20 requests the data perpetuation object 70 to generate a permanent data identification object as arguments of information on a data storage target (Step S60). In this case, as the information on a data storage target, the information that a storage target is the RDB 21, the attribute of the RDB 21, and the like are given.

Subsequently, although not shown in FIGS. 18 or 19, the processings similar to those at Steps S52 to S58 are conducted, whereby data is updated in the RDB 21 of the SCM system 20, the updated data is further transmitted from the SCM system 20 to the SFA system 30, and data is similarly updated in the SFA system 30.

As described above, in the present embodiment, in the case where a plurality of systems hold the identical data in each storage apparatus in duplicate, data to be updated in each storage apparatus is determined by the permanent data identification object, and the updated data is transmitted between the role objects generated based on the collaboration information of the master maintenance table 71, in accordance with the relating object also generated based on the collaboration information of the master maintenance table 71.

More specifically, in the above-mentioned configuration, unlike the prior art, the consistency of information among a plurality of systems is not maintained by directly transmitting information required to be updated to another system through file transfer or the like, but information held in a plurality of systems in duplicate can be managed in a unified manner by defining the collaboration between systems in the master maintenance table 71.

Because of this, each system can maintain the consistency of information among a plurality of systems without awareness of the difference in architecture between systems holding the identical information. Furthermore, the processing of generating an object for conducting collaboration between systems is centralized at the data perpetuation object 70. Therefore, in the case where the collaboration between systems is changed, or a new system is added, the master maintenance table 71 may merely be corrected. As a result, a plurality of systems can be combined without awareness of the difference in architecture among them, and an integrated information processing system that is easily configured can be provided.

Each processing at Steps S55 to S58 in the data perpetuation object can also be conducted similarly by requesting the intersystem collaboration object 40 to do it.

The intersystem collaboration object 40 described in Embodiments 1 to 3 and the data perpetuation object 70 described in Embodiment 4 can be realized respectively as programs, and distributed to the market by being stored in a computer-readable recording medium such as a floppy disk and a CD-ROM.

INDUSTRIAL APPLICABILITY

As described above, in a collaboration apparatus between information processing systems, a plurality of information processing means can be combined without awareness of the difference in architecture among them, and a burden for integrating systems and configuring an intercompany collaboration system can be reduced. Furthermore, an integrated information processing system that is easily configured can be provided by using the collaboration apparatus between information processing systems.

The invention claimed is:

1. A data perpetuation object between information processing systems for performing unified management of data managed in duplicate by a plurality of information processing including an information processing system based on different architectures, the data perpetuation object stored in a computer-readable recording medium and being implemented as an object to be operated singly, the data perpetuation object comprising:

an information identification object generating part that generates an information identification object that determines information to be stored in a storage apparatus of each information processing system;

a collaboration information storage that stores information on a communication method between the information processing systems as collaboration information among the plurality of information processing systems;

a role object generating part that generates a role object as an active role with respect to an information processing system that is a data transmission origin, and a role object as a passive role with respect to an information processing system that is a data transmission destination; and a relating object generating part that refers to the collaboration information of the collaboration information storage and generating a relating object for transmitting information to be stored in a storage apparatus of each information processing system between the role objects, in accordance with a communication method between the information processing system that is the data transmission origin and the information processing system that is the data transmission destination.

2. The data perpetuation object between information processing systems according to claim 1, wherein the communication method is selected from a plurality of kinds of communication method including real communication, delayed batch communication, and batch communication.

3. An integrated information processing system including a plurality of information processing subsystems, the plurality of information processing subsystems including an information processing subsystem based on different architectures, the integrated information processing system including a processor and comprising:
- a collaboration information storage that stores information on a communication method between the information processing subsystems as collaboration information among the plurality of information processing subsystems; and
- a data perpetuation object between the information processing subsystems that refers to the collaboration information of the collaboration information storage and that performs unified management of data managed in duplicate by the information processing subsystem, the data perpetuation object apparatus being implemented as an object to be operated singly, and comprising:
- an information identification object generating part that generates an information identification object that determines information to be stored in a storage apparatus of each information processing subsystem;
- a role object generating part for generating a role object as an active role with respect to an information processing subsystem that is a data transmission origin, and a role object as a passive role with respect to an information processing subsystem that is a data transmission destination; and
- a relating object generating part that refers to the collaboration information of the collaboration information storage and generates a relating object for transmitting information to be stored in a storage apparatus of each information processing subsystem between the role objects in accordance with a communication system between the information processing subsystem that is the data transmission origin and the information processing subsystem that is the data transmission destination.

4. A computer-readable recording medium storing a collaboration program between information processing systems that allows a computer to execute, as a data perpetuation object to be operated singly, processing of performing unified management of data managed in duplicate by a plurality of information processing systems including an information processing system based on different architectures, the collaboration program allowing the computer to execute:
- processing of generating an information identification object that determines information to be stored in a storage apparatus of each information processing system of the information processing systems;
- processing of generating a role object as an active role with respect to an information processing system that is a data transmission origin, and generating a role object as a passive role with respect to an information processing system that is a data transmission destination; and
- processing of referring to collaboration information including information on a communication method between the information processing systems and generating a relating object for transmitting information to be stored in a storage apparatus of each information processing system between the role objects in accordance with the communication method between the information processing system that is the data transmission origin, and the information processing system that is the data transmission destination.

5. A method of performing unified management of data managed in duplicate by a plurality of information systems based on different architecture, the method being carried out by a data perpetuation object to be operated singly, and comprising:
- generating an information identification object that determines information to be stored in a storage apparatus of each of the plurality of information systems;
- storing information on a communication method between the information processing systems as collaboration information among the plurality of information processing systems;
- generating a role object as an active role with respect to an information processing system that is a data transmission origin, and a role object as a passive role with respect to an information processing system that is a data transmission destination; and
- referring to the collaboration information of the collaboration information storage and generating a relating object for transmitting information to be stored in a storage apparatus of each information processing system between the role objects, in accordance with a communication method between the information processing system that is the data transmission origin and the information processing system that is the data transmission destination.

6. The method according to claim 5, wherein the communication method is selected from a plurality of kinds of communication methods including real communication, delayed batch communication, and batch communication.

* * * * *